(12) United States Patent
Chang et al.

(10) Patent No.: US 7,298,165 B2
(45) Date of Patent: Nov. 20, 2007

(54) ACTIVE DEVICE ARRAY SUBSTRATE, LIQUID CRYSTAL DISPLAY PANEL AND EXAMINING METHODS THEREOF

(75) Inventors: Yuan-Hao Chang, Taipei (TW); Chin-Hai Huang, Taipei County (TW); Kuang-Hsiang Lin, Taoyuan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 142 days.

(21) Appl. No.: 11/307,044

(22) Filed: Jan. 20, 2006

(65) Prior Publication Data

US 2007/0170948 A1 Jul. 26, 2007

(51) Int. Cl.
*G01R 31/00* (2006.01)
*G02F 1/136* (2006.01)

(52) U.S. Cl. .......................... 324/770; 349/42
(58) Field of Classification Search .............. None
See application file for complete search history.

(56) References Cited

U.S. PATENT DOCUMENTS 5,745,200 A * 4/1998 Kikuchi et al. ............ 349/99
6,859,195 B2 * 2/2005 Kodate ...................... 349/48
2005/0046439 A1 * 3/2005 Yu ............................. 324/770
2007/0018680 A1 * 1/2007 Jeon et al. .................. 324/770
2007/0030408 A1 * 2/2007 Lin et al. .................... 349/40
2007/0115406 A1 * 5/2007 Kim ........................... 349/110
2007/0152941 A1 * 7/2007 Tien et al. ................... 345/95
2007/0171318 A1 * 7/2007 Lai ............................. 349/42

FOREIGN PATENT DOCUMENTS

JP 05-307192 11/1993
TW 1239403 9/2005

* cited by examiner

*Primary Examiner*—Jermele Hollington
(74) *Attorney, Agent, or Firm*—Jianq Chyun IP Office (57) ABSTRACT

Pixel units are disposed in a display region of a substrate, and scan lines and data lines are used to control the pixel units. Inner short ring includes a first segment, a second segment and a connecting segment connecting both segments. The gates and sources of the first and second active device connect with the first and second segments respectively, and the drains connect with the connecting segment. The gates and sources of part of the third active devices connect with the first segment, and the drains connect with the odd scan lines. The gates and sources of other third active devices connect with the second segment, and the drains connect with the even scan lines. The gates of the fourth active devices connect with connecting lines, and the sources connect with data testing lines, and the drains connect with the odd and even data lines respectively.

26 Claims, 3 Drawing Sheets

FIG. 3

ACTIVE DEVICE ARRAY SUBSTRATE, LIQUID CRYSTAL DISPLAY PANEL AND EXAMINING METHODS THEREOF

BACKGROUND OF THE INVENTION

1. Field of Invention

The present invention relates to an active device array substrate, a display panel and examining methods thereof. More particularly, the present invention relates to an active device array substrate, a liquid crystal display panel having an inner short ring and examining methods thereof.

2. Description of Related Art

In response to the increasing demand of the display, the industry put efforts in the development of the display. Among the displays, the cathode ray tube (CRT) has occupied the display market for many years, due to its high display quality and mature technology. However, the rising "environmental protection" awareness against its power consumption and radiation disadvantage, and its limited flattening capability against the market demands of light, thin, short, small, chic, and power-saving displays, have limited the growing space of CRTs. Therefore, the thin film transistor liquid crystal display (TFT-LCD), having superior properties such as high image quality, good space utilization, low power consumption and no radiation, has become the mainstream display product of the market.

The TFT-LCD mainly comprises a liquid crystal display panel and a backlight module. The liquid crystal display panel usually comprises a thin film transistor array substrate, a color filter substrate and a liquid crystal layer disposed between the two substrates. And the backlight module is used to provide a surface light source for the liquid crystal display panel, such that the liquid crystal module may achieve the display effect.

The thin film transistor array substrate may be divided into a display region and a peripheral circuit region, wherein a plurality of pixel units are disposed in an array on the display region, and each of the pixel units comprises a thin film transistor and a pixel electrode connected with the thin film transistor. Moreover, a plurality of scan lines and data lines are disposed in the peripheral circuit region and the display region, wherein the thin film transistor of each pixel unit is controlled by the corresponding scan line and data line.

Usually, after the manufacturing process of the film transistor array substrate, an electrical examination is performed on the pixel units on the thin film transistor array substrate so as to determine whether the pixel units work normally. When the pixel units cannot work normally, the defective components (such as the thin film transistor or the pixel electrode) or the circuit can be repaired. However, in order to examine the pixel units, an examining circuit should be fabricated on the peripheral circuit region of the thin film transistor array substrate. It should be noted that, the examining circuit is complicated, and may reduce the layout region on the panel. Furthermore, after completing the examination, the examining circuits are disabled by a laser cutting technology, so as to avoid affecting the display quality of the liquid crystal display panel.

In addition, electrostatic accumulation may occur in the liquid crystal display panel, due to external factors, such as transportation or environment variation. Therefore, when the charges accumulate to a certain amount, the circuit or the thin film transistor on the thin film transistor array substrate may be damaged due to the electrostatic discharge (ESD). To avoid the problem, an ESD protection circuit is usually disposed in the peripheral circuit region of the thin film transistor array substrate.

However, conventionally, to achieve the above examination and electrostatic protection functions, an examining circuit and an ESD protection circuit should be fabricated simultaneously in the peripheral circuit region of the thin film transistor array substrate. As a result, the layout of the peripheral circuit becomes more complicated, thus resulting in insufficient layout space, which works against the simplification of the manufacturing process and the improvement of the production efficiency.

SUMMARY OF THE INVENTION

Accordingly, an object of the present invention is to provide an active device array substrate with a simple layout.

Another object of the present invention is to provide a liquid crystal display panel having an examining circuit that can be simplified.

Yet another object of the present invention is to provide a method for examining whether short circuit occurs between the lines of the active device array substrate.

Still another object of the present invention is to provide a method for examining whether the liquid crystal display panel displays normally.

Based on the above and other objects, the present invention provides an active device array substrate, comprising a substrate, a plurality of pixel units, a plurality of scan lines, a plurality of data lines, two data testing lines, an inner short ring, a first active device, a second active device, a plurality of third active devices and a plurality of fourth active devices. The substrate has an adjacent display region and a peripheral circuit region. The pixel units are disposed in the display region. The scan lines and the data lines are disposed on the substrate, and used to control the pixel units. The data testing lines are disposed in the peripheral circuit region. The inner short ring is disposed in the peripheral circuit region, and comprises a first segment, a second segment and a connecting segment electrically connected between the first segment and the second segment. The first active device, the second active device, each of the third active devices and each of the fourth active devices have a gate, a source and a drain. The gate and the source of the first active device connect with the first segment, and the drain connects with the connecting segment. The gate and the source of the second active device connect with the second segment, and the drain connects with the connecting segment. The third active device is disposed in the peripheral circuit region, wherein the gates and the sources of part of the third active devices connect with the first segment, and the corresponding drains connect with the odd scan lines, while the gates and the sources of other third active devices connect with the second segment, and the corresponding drains connect with the even scan lines. The fourth active devices are disposed in the peripheral circuit region, wherein the gates of the fourth active devices connect with the connecting segment, part of the sources connect with one of the data testing lines respectively, and the corresponding drains connect with the odd data lines, while the other sources connect with another data testing lines, and the corresponding drains connect with the even data lines.

According to one embodiment of the present invention, the inner short ring is located outside the data testing lines.

According to one embodiment of the present invention, each of the pixel units comprises a fifth active device and a pixel electrode. The fifth active device electrically connects with the corresponding scan and data lines, and the pixel electrode electrically connects with the third active devices.

According to one embodiment of the present invention, the active device array substrate further comprises a plurality of examining pads disposed in the peripheral circuit region on the substrate, and the terminals of the first and second segments of the inner short ring connect with one of the examining pads respectively, and one terminal of each data testing line connects with one of the examining pads.

According to one embodiment of the present invention, the active device array substrate further comprises a plurality of common lines and an examining line connecting with one terminal of the common lines, wherein the common lines are disposed on the substrate, and extend from the display region to the peripheral circuit region, and the examining line is disposed in the peripheral circuit region on the substrate.

According to one embodiment of the present invention, the data testing lines are dummy data lines, and the data testing lines are located at two sides of the data lines.

According to one embodiment of the present invention, the data testing lines are another inner short ring.

The present invention further provides a liquid crystal display panel, which comprises an active device array substrate described above, a color filter substrate and a liquid crystal layer. The liquid crystal layer is disposed between the color filter substrate and the active device array substrate.

The present invention further provides a method for examining the active device array substrate, suitable for the above active device array substrate. The method for examining the active device array substrate comprises the steps of inputting a first scan signal to the first segment of the inner short ring, to start the first and fourth active devices, wherein the first scan signal is input to the odd scan lines by part of the third active devices; inputting a second scan signal to the second segment of the inner short ring, to shut down the second active device and part of the third active devices connecting with the even scan lines, wherein the first scan signal is a high gate voltage (Vgh) signal, and the second scan signal is a low gate voltage (Vgl) signal; inputting a first data signal to one of the data testing lines, wherein the first data signal is input to the corresponding data lines by part of the fourth active devices; and measuring the voltage of the other data testing line.

The present invention provides a method for examining the active device array substrate, suitable for the active device array substrate described above. The method for examining the active device array substrate comprises the steps of inputting a first scan signal to the first segment of the inner short ring; inputting a second scan signal to the second segment of the inner short ring; and measuring the voltage of the data testing lines.

According to one embodiment of the present invention, the first scan signal is a Vgh signal, and the second scan signal is a Vgl signal. Alternatively, the first and second scan signals are both Vgh signals.

The present invention provides a method for examining the active device array substrate, suitable for the active device array substrate described above. The method for examining the active device array substrate comprises the steps of inputting a first scan signal to the first segment of the inner short ring; inputting a second scan signal to the second segment of the inner short ring; and measuring the voltage of the examining line.

According to one embodiment of the present invention, the first scan signal is a Vgh signal, and the second scan signal is a Vgl signal. Alternatively, the first and second scan signals are both Vgh signals.

The present invention provides a method for examining the active device array substrate, suitable for the active device array substrate described above. The method for examining the active device array substrate comprises the steps of inputting a first scan signal to the first segment of the inner short ring; inputting a second scan signal to the second segment of the inner short ring, wherein at least one of the first and second scan signals are Vgh signals; inputting a first data signal to one of the data testing lines, wherein the first data signal is input to the corresponding data lines by part of the fourth active devices; and measuring the voltage of the examining line.

The present invention provides a method for examining the liquid crystal display panel, suitable for the liquid crystal display panel described above. The examining method comprises the steps of providing a light source, and disposing the liquid crystal display panel above the light source; inputting a first scan signal to the first segment of the inner short ring; inputting a second scan signal to the second segment of the inner short ring; inputting a first data signal to one of the data testing lines; and inputting a second data signal to the other data testing line.

According to one embodiment of the present invention, after inputting the first and second scan signals and the first and second data signals to the first segment, the second segment, one of the data testing lines and the other data testing line, the liquid crystal display panel displays a black, white or gray image.

According to one embodiment of the present invention, after inputting the first and second scan signals and the first and second data signals to the first segment, the second segment, one of the data testing lines and the other data testing lines, the liquid crystal display panel displays an image of bright horizontal or vertical line.

According to one embodiment of the present invention, after inputting the first and second scan signals and the first and second data signals to the first segment, the second segment, one of the data testing lines and the other data testing line, the liquid crystal display panel displays an image of bright spots array.

As described above, the present invention employs the inner short ring, the first and second devices as an examining circuit, such that the examining circuit and the ESD protection circuit can be integrated as a whole. Therefore, the layout is simplified, the number of the examining pads is reduced, and the layout space is increased. Moreover, the display image of the liquid crystal display panel will not be affected by the examining circuit owing to the third and fourth active devices. Therefore, the examining circuit may be cut off without a laser cutting process, or an additional laser cutter. Furthermore, in the present invention, a single examining circuit is used to examine the odd or even scan lines, such that the input odd and even signals will not affect each other.

In order to the make the aforementioned and other objects, features and advantages of the present invention apparent, the preferred embodiments are described in detail below in accompany with drawings.

DESCRIPTION OF EMBODIMENTS

Figure 1:
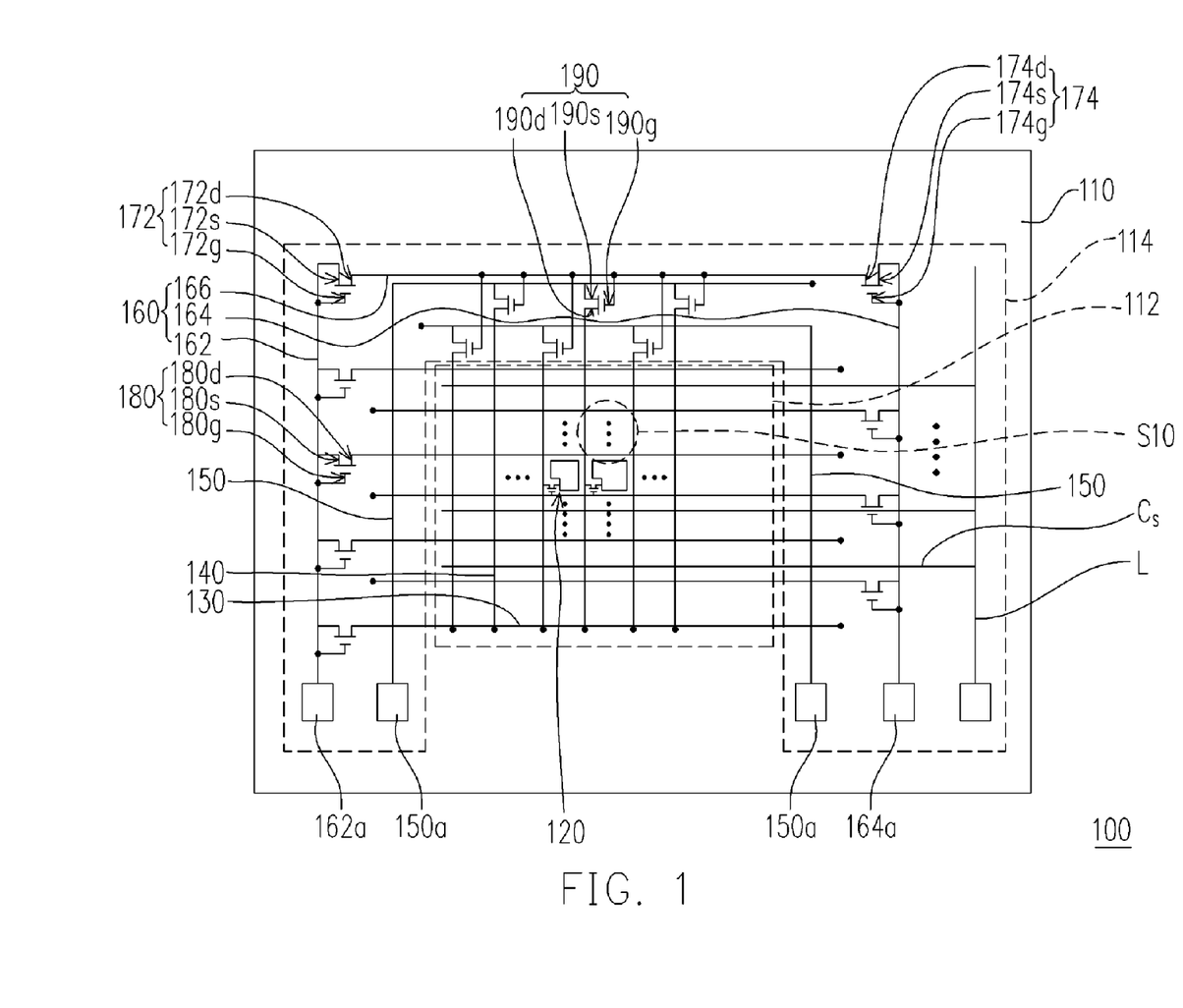
FIG. 1 shows a structural view of an active device array substrate according to a preferred embodiment of the present invention.

FIG. 1 shows a structural view of an active device array substrate according to a preferred embodiment of the present invention. Referring to FIG. 1, an active device array substrate 100 comprises a substrate 110, pixel units 120, scan lines 130, data lines 140, two data testing lines 150, an inner short ring 160, a first active device 172, a second active device 174, third active devices 180 and fourth active devices 190.

The substrate 110 can be a glass substrate, a quartz substrate or a substrate made of other suitable materials, and has an adjacent display region 112 and a peripheral circuit region 114. The pixel units 120 are disposed in the display region 112. The scan lines 130 can be aluminum alloy wires or wires made of other suitable conductive materials. And the data lines 140 can be chromium metal wires, aluminum alloy wires or wires made of other suitable conductive materials. The scan lines 130 and the data lines 140 are both disposed on the substrate 110 for controlling the pixel units 120. The data testing lines 150 can be chromium metal wires, aluminum alloy wires or wires made of other suitable conductive materials, and disposed in the peripheral circuit region 114. The inner short ring 160 can be an aluminum alloy wire, a dual-metal-layer wire or a wire made of other suitable conductive materials. The inner short ring 160 is disposed in the peripheral circuit region 114, and includes a first segment 162, a second segment 164 and a connecting segment 166 electrically connected between the first segment 162 and the second segment 164.

The first active device 172, the second active device 174, the third active devices 180 and the fourth active devices 190 can be thin film transistors, low-temperature poly silicon thin film transistors (LTPS-TFT) or other switch devices with three terminals. The first active device 172, the second active device 174, the third active devices 180 and the fourth active devices 190 are all disposed on the substrate 110. The first active device 172 has a gate 172g, a source 172s and a drain 174d. The second active device 174 has a gate 174g, a source 174s and a drain 174d. Each of the third active devices 180 has a gate 180g, a source 180s and a drain 180d. Each of the fourth active devices 190 has a gate 190g, a source 190s and a drain 190d.

The gate 172g and the source 172s of the first active device 172 connect with the first segment 162, and the drain 172d connects with the connecting segment 166. The gate 174g and the source 174s of the second active device 174 connect with the second segment 164, and the drain 174d connects with the connecting segment 166. In other words, the connecting segment 166 electrically connects with the first segment 162 and the second segment 164 by the first active device 172 and the second active device 174.

The third active devices 180 are disposed in the peripheral circuit region 114, wherein the gates 180g and the sources 180s of the third active devices 180 connect with the first segment 162, and the corresponding drains 180d connect with the odd scan lines 130. The gates 180g and the sources 180s of the other third active devices 180 connect with the second segment 164, and the corresponding drains 180d connect with the even scan lines 130.

The fourth active devices 190 are disposed in the peripheral circuit region 114, wherein the gates 190g of the fourth active devices 190 connect with the connecting segment 166, and part of the sources 190s connect with one of the data testing lines 150 respectively. The corresponding drains 190d connect with the odd data lines 140, the other sources 190s connect with the other data testing line 150, respectively. The corresponding drains 190d connect with the even data lines 140.

It should be noted that, in the present embodiment, the active device array substrate 100 further comprises examining pads 162a, 164a and 150a, disposed in the peripheral circuit region 114 on the substrate 110. The terminals of the first segment 162 and the second segment 164 of the inner short ring 160 connect with the examining pads 162a, 164a respectively, and one terminal of each data testing line 150 connects with one of the examining pads 150a. The examining pads 162a, 164a and 150a are to be pressed by a probe of the examining machine to input or read voltage signals. The examining pads 162a, 164a and 150a may be disposed in a suitable position on the substrate 110, to be pressed by the probe of the examining machine.

In addition, the data testing lines 150 are dummy data line, and the data testing lines 150 are located at two sides of the data lines 140, while the inner short ring 160 is located outside the data testing lines 150. It should be noted that, in other embodiments, the data testing lines 150 are another inner short ring 160, and the inner short ring 160 is not limited to being outside the data testing lines 150.

The active device array substrate 100 of the present embodiment also comprises common lines Cs and an examining line L connected with the common lines Cs, wherein the common lines Cs are disposed on the substrate, and extend from the display region 112 to the peripheral circuit region 114, while the examining line L is disposed in the peripheral circuit region 114 on the substrate 110. Generally speaking, the common lines Cs and the examining line L are not essential elements, so the active device array substrate of other embodiments does not always include the common lines Cs and the examining line L.

Figure 2:
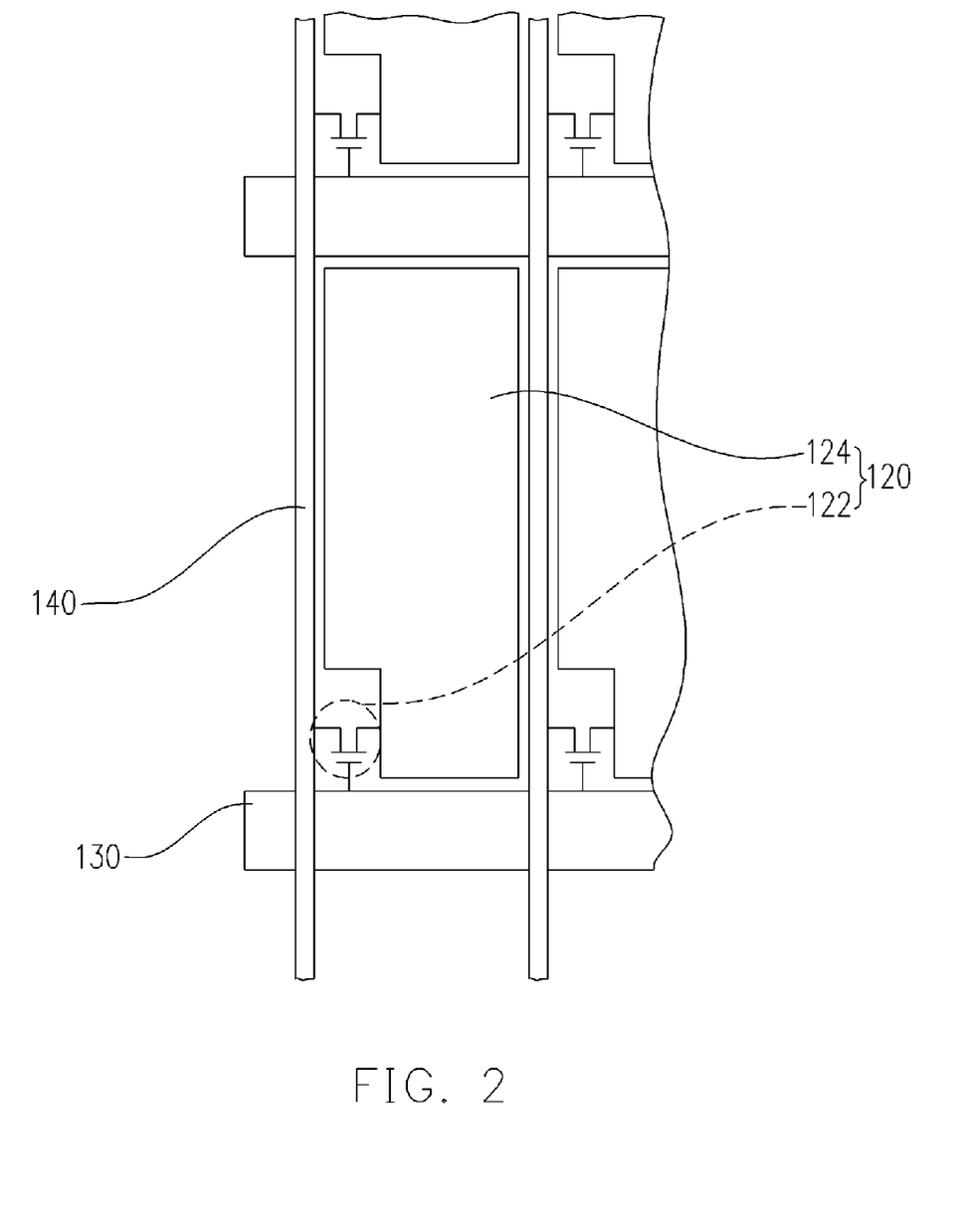
FIG. 2 shows a partial enlarged view of the section S10 in FIG. 1.

FIG. 2 shows a partial enlarged view of the section S10 in FIG. 1. Referring to FIG. 2, in the active device array substrate 100, the pixel unit 120 includes a fifth active device 122 and a pixel electrode 124. The fifth active device 122 can be a thin film transistor, a LTPS-TFT or other switch device with three terminals, and electrically connects with the corresponding scan line 130 and data line 140. The pixel electrode 124 electrically connects with the third active devices 130, and the pixel electrode 124 can be a transparent electrode, a reflective electrode or a transflective electrode. As described above, the material of the pixel electrode 124 may be Indium Tin Oxide (ITO), Indium Zinc Oxide (IZO), metal or other conductive materials.

In the active device array substrate 100, the inner short ring 160 and the third active devices 180 may be used to prevent the electrostatic damage and the data testing lines 150 and the fourth active devices 190 also have the same function. For example, when the electro-static is conducted to the first segment 162, a plurality of third active devices 180 connecting the first segment 162 should be turned on firstly, such that the electro-static may be conducted to the scan line 130. However, only when the voltage of the gates 180g of the third active devices 180 reaches a certain threshold voltage, the sources 180s and the drains 180d can be conducted. Therefore, a part of the electro-static accumulates at the gates 180d of the third active devices 180 and the remaining part will thus be conducted to the scan lines 130. As the first segment 162 of the inner short ring 160 electrically connects with the scan lines 130 by third active devices 180, the electro-static forms several shunts through conduction paths. By starting third active devices 180 and forming several shunts through paths, the static current conducted to each of the scan lines 130 is significantly reduced. In other words, the inner short ring 160 and the third active devices 180 can be used to prevent the partial circuit from the electro-static damage. Therefore, the first active device 172, the second active device 174 and the inner short ring 160 may also be referred to as the ESD protection circuit. Additionally, the first active device 172 and second active device 174 may also be referred to as the ESD protection device. Furthermore, the mechanism of the data testing lines 150 and the fourth active devices 190 to prevent the electrostatic damage is similar to the above, and will not be repeated here. It should be noted that, the first active device 172, the second active device 174 and the inner short ring 160 not only can be used as an ESD protection circuit, but also an examining circuit of the active device array substrate 100. The inner short ring 160, the first active device 1 72 and the second active device 174 are used as an examining circuit, such that the examining circuit and the ESD protection circuit are integrated as a whole, so the layout is simple, the number of the examining pads is reduced and the layout space is large. The data testing lines 150 and the fourth active devices 190 may also be used as an ESD protection circuit, and also as an examining circuit of the active device array substrate 100. Four methods for examining the active device array 100 will be described in detail hereinafter.

The first method for examining the active device array substrate 100 comprises the steps of inputting a first scan signal to the first segment 162 of the inner short ring 160 to start the first active device 172 and the fourth active devices 190, wherein the first scan signal is input to the odd scan lines 130 by part of the third active devices 180; inputting a second scan signal to the second segment 164 of the inner short ring 160, to shut down the second active device 174 and part of the third active devices 180 connecting with the even scan lines 130. It should be noted that, said first scan signal is a high gate voltage (Vgh) signal, and the second scan signal is a low gate voltage (Vgl) signal. Then, the steps further include inputting a first data signal to one of the data testing lines 150, wherein the first data signal is input to the corresponding data lines 130 by part of the fourth active devices 190; and measuring the voltage of the other data testing line 150. When measuring the other data testing line 150, if a voltage signal similar to that of the first data signal is measured, a short circuit may occur between the odd data lines 140 and the even data lines 140.

The second method for examining the active device array substrate 100 comprises the steps of inputting a first scan signal to the first segment 162 of the inner short ring 160; then inputting a second scan signal to the second segment 164 of the inner short ring 160; and measuring the voltage of the data testing lines 150. When said first scan signal is a Vgh signal and the second scan signal is a Vgl signal, the first active device 172 and the fourth active devices 190 will be turned on, and part of the third active devices 180 will also be turned on. In the present embodiment, the started third active devices 180 connect with the odd scan lines 130. When the data testing lines 150 are measured, if one of the data testing lines 150 is measured to have a voltage signal similar to that of the first scan signal, a short circuit occurs between the odd or even data lines 140 and the odd scan lines 130.

As described above, if the measuring result is normal under the above conditions, the first and second scan signals can be changed to be Vgh signals. At that time, one of the data testing lines 150 is measured to determine whether there is a voltage signal similar to the second scan signal or not, in order to judge whether a short circuit occurs between the odd or even data lines 140 and the even scan lines 130. It should be noted that, if the first scan signal is changed to be a Vgl signal and the second scan signal is changed to a Vgh signal directly, one of the data testing lines 150 is measured to determine whether there is a voltage signal similar to that of the first scan signal or not, in order to judge whether a short circuit occurs between the odd or even data lines 140 and the even scan lines 130 or not.

The third method for examining the active device array substrate 100 comprises the steps of inputting a first scan signal to the first segment 162 of the inner short ring 160; inputting a second scan signal to the second segment 164 of the inner short ring 160; and measuring the voltage of the examining line L. If the first scan signal is a Vgh signal and the second scan signal is a Vgl signal, the first active device 172 and the fourth active devices 190 are turned on, and part of the third active devices 180 are also turned on. In the present embodiment, the started third active devices 180 connect with the odd scan lines 130. If the examining line L is measured to have a voltage signal similar to that of the first scan signal, a short circuit occurs between the common lines Cs and the odd scan lines 130.

As described above, if the measuring result is normal under the above conditions, the first and second scan signals may be changed to the Vgh signal. At that time, the examining line L is measured to determine whether is has a voltage signal similar to that of the second scan signal or not, in order to judge whether a short circuit occurs between the common lines Cs and the even scan lines 130. Similarly, if the first scan signal is changed to the Vgl signal and the second scan signal is changed to the Vgh signal directly, the examining line L is measured to determine whether it has a voltage signal similar to that of the first scan signal or not, in order to judge whether a short circuit occurs between the common lines Cs and the even scan lines 130.

The fourth method for examining the active device array substrate comprises the steps of inputting a first scan signal to the first segment 162 of the inner short ring 160; then inputting a second scan signal to the second segment 164 of the inner short ring 160; inputting a first data signal to one of the data testing lines 150, wherein the first data signal is input to the corresponding data lines 140 by part of the fourth active devices 190; and measuring the voltage of the examining line L. Therein, at least one of the first and second scan signals is the Vgh signal. Therefore, the fourth active devices 190 are turned on. If the examining line L is measured to have a voltage signal similar to that of the first data signal, a short circuit occurs between the common lines Cs and the odd or even data lines 140.

From the above methods for examining the active device array substrate 100, it can be known that the present embodiment employs the inner short ring, the first active device and second active device as a single examining circuit to examine the odd or even scan lines, and the input odd and even signals will not affect each other. The inner short ring 160 not only can be used to prevent electrostatic damage, but also as an examining circuit of array testing of the active device array substrate 100. By using the methods for examining the active device array substrate 100, the circuit of the active device array substrate 100 can be examined quickly. Therefore, the examining time can be reduced and also the efficiency of the examining process can be improved.

Figure 3:
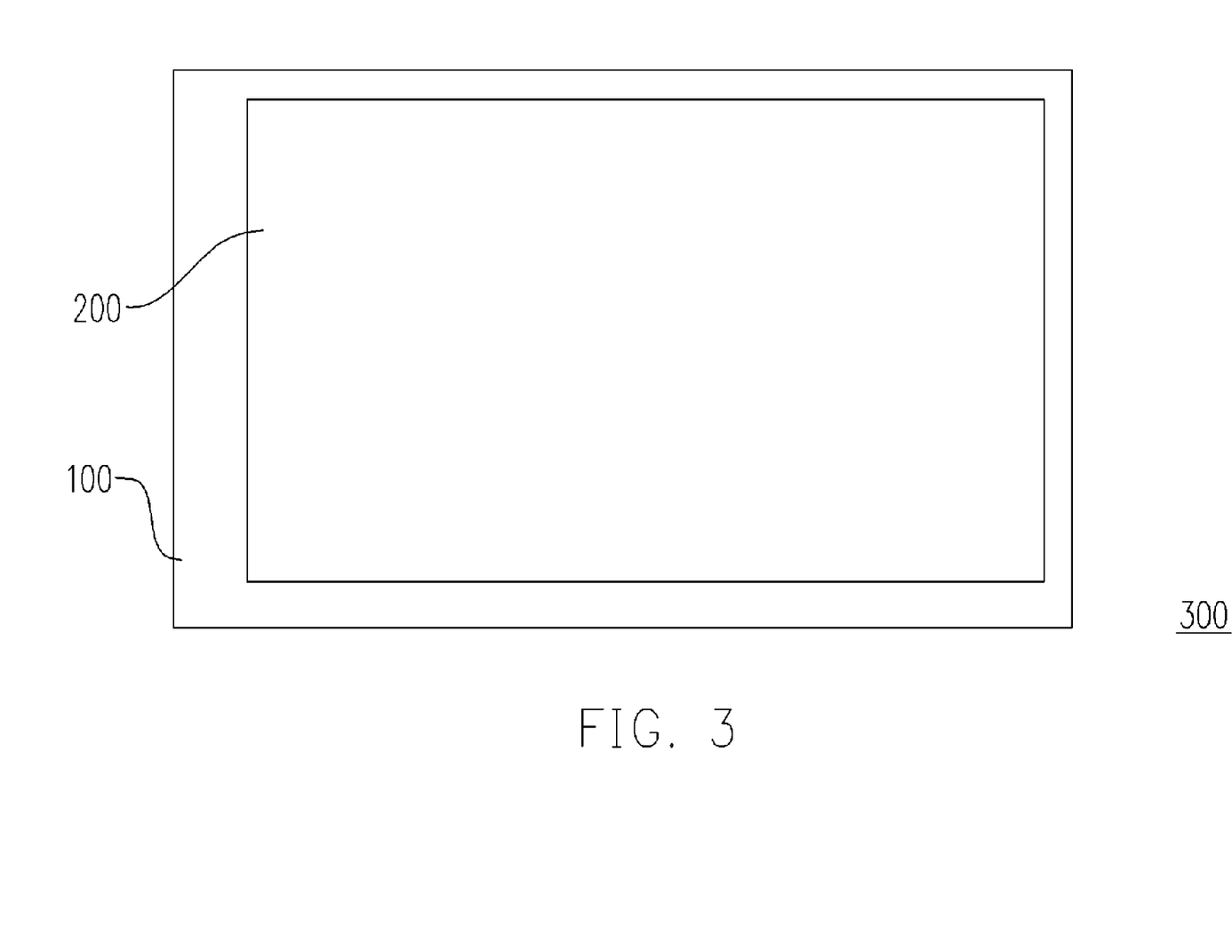
FIG. 3 shows a top view of a liquid crystal display panel assembled using the active device array substrate of FIG. 1.

The active device array substrate 100 can be used to assemble a liquid crystal display panel. FIG. 3 shows a top view of a liquid crystal display panel assembled using the active device array substrate of FIG. 1. Referring to FIG. 3, the liquid crystal display panel 300 comprises an active device array substrate 100 described above, a liquid crystal layer (not shown) and a color filter substrate 200. The color filter substrate 200 is disposed above the active device array substrate 100, and the liquid crystal layer is disposed between the active device array substrate 100 and the color filter substrate 200. As the liquid crystal display panel 300 comprises an active device array substrate 100, an examining circuit on the active device array substrate 100 can be used as the examining circuit for the panel test. The method for examining the liquid crystal display panel 300 will be described in detail with reference to FIGS. 1 and 3 hereinafter.

The method for examining the liquid crystal display panel 300 comprises the steps of providing a light source, and disposing the liquid crystal display panel 300 above the light source, wherein the light source can be a backlight module; then inputting a first scan signal to the first segment 162 of the inner short ring 160; inputting a second scan signal to the second segment 162 of the inner short ring 160; inputting a first data signal to one of the data testing lines 150; and inputting a second data signal to the other data testing line 150.

After inputting the first scan signal, the second scan signal, the first data signal and second data signal to the first segment, the second segment, one of the data testing lines and the other data testing line, the liquid crystal display panel 300 may display many different display images, such as black, white or gray images. The black image may be used to examine whether the bright point or bright line is generated on the liquid crystal display panel 300 or not. The white image may be used to examine whether the dark point or dark line is generated on the liquid crystal display panel 300. And the gray image is usually used to examine whether a mura shows in the display image of the liquid crystal display panel 300.

In addition to the above display images, the liquid crystal display panel 300 may also display an image of bright horizontal or vertical line. Under this display image, it is easy to examine whether the data line 140 or the scan line 130 has defects, such as broken line and short circuit. Furthermore, the liquid crystal display panel 300 further displays an image of bright spot array, and under this image, it is easier to examine the bright point, micro bright point or flash point.

By using the method for examining the liquid crystal display panel 300, the display image of the liquid crystal display panel 300 can be efficiently examined, in order to reduce the examining time and improve the efficiency of the examining process.

In view of the above, the active device array substrate and liquid crystal display panel of the present invention and the examining method thereof have at least the following advantages:

(1) The present invention employs an inner short ring, a first active device, and a second active device as an examining circuit, such that the examining circuit and the ESD protection circuit can be integrated as a whole, and therefore the layout is simple, the number of the examining pad is reduced and the layout space is large.

(2) The present invention provides the examining circuit integrated with the ESD protection circuit as a whole, thus the charge and discharge of the pixel units are not affected by the test circuit by utilizing the third and fourth active devices, i.e. the display image of the liquid crystal display panel will not be affected by the examining circuit. Therefore, a laser cutting process for cutting off the examining circuit is not necessary, and an additional laser cutter is not required.

(3) The present invention employs an inner short ring, a first active device and a second active device as a single examining circuit to examine the odd or even scan lines, such that the odd and even signals will not affect each other.

(4) By using the methods for examining the active device array substrate and the liquid crystal display panel of the present invention, the circuit of the active device array substrate and the display image of the liquid crystal display panel can be efficiently examined. Therefore, the examining time is reduced and also the efficiency of the examining process is improved.

(5) The examining methods of the present invention can be applied in the existing array examining machine with no additional examining equipment required.

(6) The active device array substrate and liquid crystal display of the present invention and the examining method thereof can be applied in a display product of small size, facilitating the transformation of small-sized factories and mass production.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active device array substrate, comprising:
   a substrate, having a display region and a peripheral circuit region;
   a plurality of pixel units, disposed in the display region;
   a plurality of scan lines, disposed on the substrate;
   a plurality of data lines, disposed on the substrate, wherein the scan lines and data lines control the pixel units;
   two data testing lines, disposed in the peripheral circuit region;
   an inner short ring, disposed in the peripheral circuit region, wherein the inner short ring comprises a first segment, a second segment and a connecting segment electrically connecting between the first segment and the second segment;
   a first active device, having a gate, a source and a drain, wherein the gate and the source connect with the first segment, and the drain connects with the connecting segment;
   a second active device, having a gate, a source and a drain, wherein the gate and the source connect with the second segment, and the drain connects with the connecting segment;
   a plurality of third active devices, disposed in the peripheral circuit region, each of the third active devices having a gate, a source and a drain, wherein the gates and the sources of part of the third active devices connect with the first segment, and the corresponding drains connect with the odd scan lines, while the gates and the sources of other third active devices connect with the second segment, and the corresponding drains connect with the even scan lines; and
a plurality of fourth active devices, disposed in the peripheral circuit region, each of the fourth active devices having a gate, a source and a drain, wherein the gates of the fourth active devices connect with the connecting segment, part of the sources connect with one of the data testing lines respectively, and the corresponding drains connect with the odd data lines, while the other sources connect with the other one of the data testing lines respectively, and the corresponding drains connect with the even data lines.

2. The active device array substrate as claimed in claim 1, wherein the inner short ring is located outside the data testing lines.

3. The active device array substrate as claimed in claim 1, wherein each of the pixel units comprises:
 a fifth active device, electrically connected with the corresponding scan line data line; and
 a pixel electrode, electrically connected with the third active device.

4. The active device array substrate as claimed in claim 1, further comprising a plurality of examining pads disposed in the peripheral circuit region on the substrate, wherein the first segment of the inner short ring and the terminal of the second segment connect with one of the examining pads respectively, and one terminal of each data testing line connects with one of the examining pads respectively.

5. The active device array substrate as claimed in claim 1, further comprising a plurality of common lines and an examining line connecting one terminal of the common lines, wherein the common lines are disposed on the substrate, and extend from the display region to the peripheral circuit region, while the examining line is disposed in the peripheral circuit region on the substrate.

6. The active device array substrate as claimed in claim 1, wherein the data testing lines are dummy data lines, and the data testing lines are located at two sides of the data lines.

7. The active device array substrate as claimed in claim 1, wherein the data testing lines are another inner short ring.

8. An liquid crystal display panel, comprising:
 an active device array substrate, including:
 a substrate, having an adjacent display region and a peripheral circuit region;
 a plurality of pixel units, disposed in the display region;
 a plurality of scan lines, disposed on the substrate;
 a plurality of data lines, disposed on the substrate, wherein the scan lines and the data lines control the pixel units;
 two data testing lines, disposed in the peripheral circuit region;
 an inner short ring, disposed in the peripheral circuit region, wherein the inner short ring includes a first segment, a second segment and a connecting segment electrically connected between the first segment and the second segment;
 a first active device, having a gate, a source and a drain, wherein the gate and the source connect with the first segment, and the drain connects with the connecting segment;
 a second active device, having a gate, a source and a drain, wherein the gate and the source connect with the second segment, and the drain connects with the connecting segment;
 a plurality of third active devices, disposed in the peripheral circuit region, each of the third active devices having a gate, a source and a drain, wherein the gates and the sources of part of the third active devices connect with the first segment, and the corresponding drains connect with the odd scan lines, while the gates and the sources of other third active devices connect with the second segment, and the corresponding drains connect with the even scan lines;
 a plurality of fourth active devices, disposed in the peripheral circuit region, each of the fourth active devices having a gate, a source and a drain, wherein the gates of the fourth active devices connect with the connecting segment, part of the sources connect with one of the data testing lines respectively, and the corresponding drains connect with the odd data lines, while the other the sources connect with the other one of the data testing lines, and the corresponding drains connect with the even data lines;
 a color filter substrate; and
 a liquid crystal layer, disposed between the color filter substrate and the active device array substrate.

9. The liquid crystal display panel as claimed in claim 8, wherein the inner short ring of the active device array substrate is located outside the data testing lines.

10. The liquid crystal display panel as claimed in claim 8, wherein each of the pixel units of the active device array substrate comprises:
 a fifth active device, electrically connected with the corresponding scan line and data line; and
 a pixel electrode, electrically connected with the third active device.

11. The liquid crystal display panel as claimed in claim 8, wherein the active device array substrate further comprises a plurality of examining pads disposed in the peripheral circuit region on the substrate, and the terminals of the first segment and the second segment of the inner short ring connect with one of the examining pads respectively, and one terminal of each data testing line connects with one of the examining pads.

12. The liquid crystal display panel as claimed in claim 8, wherein the active device array substrate further comprises a plurality of common lines and a examining line connected with one terminal of the common lines, wherein the common lines are disposed on the substrate, and extend from the display region to the peripheral circuit region, while the examining line is disposed in the peripheral circuit region on the substrate.

13. The liquid crystal display panel as claimed in claim 8, wherein the data testing lines of the active device array substrate are dummy data lines, and the data testing lines are located at two sides of the data lines.

14. The liquid crystal display panel as claimed in claim 8, wherein the data testing lines of the active device array substrate are another inner short ring.

15. A method for examining the active device array substrate, suitable for the active device array substrate as claimed in claim 1, the method comprising:
 inputting a first scan signal to the first segment of the inner short ring to start the first active device and the fourth active devices, the first scan signal being input to the odd scan lines by the third active devices;
 inputting a second scan signal to the second segment of the inner short ring to shut down the second active device and part of the third active devices connected with the even scan lines, wherein the first scan signal is a Vgh signal, and the second scan signal is a Vgl signal;
 inputting a first data signal to one of the data testing lines, the first data signal being input to the corresponding data lines by part of the fourth active devices; and measuring the voltage of the other data testing line.

16. A method for examining the active device array substrate, suitable for the active device array substrate as claimed in claim 1, the method comprising:
   inputting a first scan signal to the first segment of the inner short ring;
   inputting a second scan signal to the second segment of the inner short ring; and
   measuring the voltage of the data testing lines.

17. The method for examining the active device array substrate as claimed in claim 16, wherein the first scan signal is a Vgh signal, and the second scan signal is a Vgl signal.

18. The method for examining the active device array substrate as claimed in claim 16, wherein the first and second scan signals are Vgh signals.

19. A method for examining the active device array substrate, suitable for the active device array substrate as claimed in claim 5, the method comprising:
   inputting a first scan signal to the first segment of the inner short ring;
   inputting a second scan signal to the second segment of the inner short ring; and measuring the voltage of the examining line.

20. The method for examining the active device array substrate as claimed in claim 19, wherein the first scan signal is a Vgh signal, and the second scan signal is a Vgl signal.

21. The method for examining the active device array substrate as claimed in claim 19, wherein the first and second scan signals are Vgh signals.

22. A method for examining the active device array substrate, suitable for the active device array substrate as claimed in claim 5, the method comprising:
   inputting a first scan signal to the first segment of the inner short ring;
   inputting a second scan signal to the second segment of the inner short ring, wherein at least one of the first and second scan signals is a Vgh signal;
   inputting a first data signal to one of the data testing lines, the first data signal being input to the corresponding data lines by part of the fourth active devices; and
   measuring the voltage of the examining line.

23. A method for examining the liquid crystal display panel, suitable for the liquid crystal display panel as claimed in claim 8, the examining method comprising:
   providing a light source, and disposing the liquid crystal display panel above the light source;
   inputting a first scan signal to the first segment of the inner short ring;
   inputting a second scan signal to the second segment of the inner short ring;
   inputting a first data signal to one of the data testing lines; and
   inputting a second data signal to the other data testing line.

24. The examining method as claimed in claim 23, wherein after inputting the first and second scan signals and the first and second data signals to the first segment, the second segment, one of the data testing lines and the other data testing line, the liquid crystal display panel displays a black, white or gray image.

25. The examining method as claimed in claim 23, wherein after inputting the first and second scan signals and the first and second data signals to the first segment, the second segment, one of the data testing lines and the other data testing line, the liquid crystal display panel displays an image of bright horizontal or vertical line.

26. The examining method as claimed in claim 23, wherein after inputting the first and second scan signals and the first and second data signals to the first segment, the second segment, one of the data testing lines and the other data testing line, the liquid crystal display panel displays an image of bright dot array.

* * * * *